No. 788,272. PATENTED APR. 25, 1905.
L. MAGRINI.
MEANS FOR OBTAINING REDRESSED CURRENTS.
APPLICATION FILED OCT. 20, 1903.
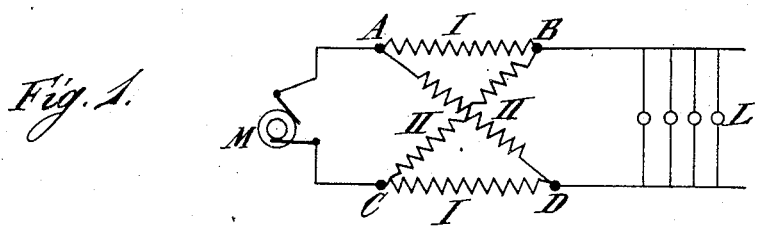
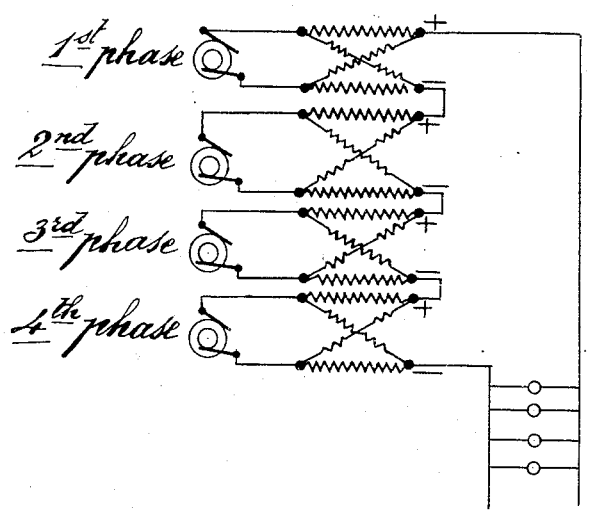
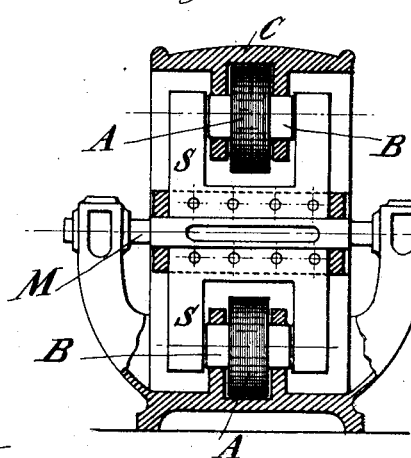
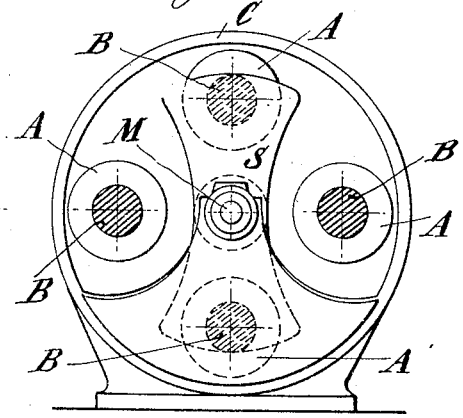

No. 788,272.                                    Patented April 25, 1905.

UNITED STATES PATENT OFFICE.

LUIGI MAGRINI, OF MILAN, ITALY.

MEANS FOR OBTAINING REDRESSED CURRENTS.

SPECIFICATION forming part of Letters Patent No. 788,272, dated April 25, 1905.

Application filed October 20, 1903. Serial No. 177,742.

*To all whom it may concern:*

Be it known that I, LUIGI MAGRINI, a subject of the King of Italy, residing at No. 28 Viale Monforte, Milan, Italy, have invented certain new and useful Improvements in Means for Obtaining Redressed Currents; and I do hereby declare the following to be a full, clear, and exact description of the invention, such as will enable others skilled in the art to which it appertains to make and use the same.

The present invention refers to new means for obtaining redressed currents from any source of monophase or polyphase alternating currents without resorting to the employment of a commutator.

The invention may be applied to the construction of rotary converters for transforming alternating into continuous currents, or vice versa, and also to the construction of continuous-current dynamos and motors having no commutator.

The principle on which the invention is based will be understood with the aid of the accompanying drawings, which show one embodiment, and in which—

Figure 1 is a diagram illustrating the principle of the invention as applied to monophase alternating currents. Fig. 2 is a similar diagram for the case of polyphase currents. Figs. 3 and 4 are respectively an axial section and a front view of a machine, showing one of the forms in which the invention may be carried into effect.

M, Fig. 1, is a monophase alternator, showing a potential difference equal to E at the collecting-brushes.

L is a group of receiving apparatus intended to utilize the commuted currents.

Between M and L four self-induction or choking coils I I II II are inserted—namely, I I between A B and C D and II II between A D and C B. Said coils are so dimensioned as to admit of their holding out against the potential difference E, as it would be the case with the primary coils or transformers, while their copper section is large enough to admit of the whole current generated by M flowing through them. Said coils are so arranged that their magnetic circuits may be opened by an appropriate device of any description whatever, thus minimizing their impedances and allowing of the alternating current flowing through them.

Let us now cause the magnetic circuit of the two coils II II to be closed just at the beginning of a phase of the current and the magnetic circuit of the two other coils I I to be just at the same time opened. Two counter electromotive forces of self-induction equal to E will arise within the coils II II, preventing the first half of the electric wave to flow through them, while the same half-wave will pass through the coils I I, whose impedance will be negligible and reach L—for instance, in the direction from A to B, returning to the source in the direction from D to C.

Let us now suppose that on the current being reversed, namely—at the beginning of the second half of the electric wave—the magnetic circuits of I I, which were formerly open, should be closed, while the magnetic circuits of II II are being interrupted. The reversed half-wave will then be shut off from I I and allowed to find its way through II II, being thus enabled to reach L through C B in the same direction as it was the case with the first half-wave and to return to the source through D A. The flowing of unidirected currents through the receiving apparatus L would thereby be secured.

Should polyphase instead of monophase currents have to be redressed, the arrangement of the choking-coils ought to be as shown in the diagram Fig. 2.

On explaining the principle of the invention I have alluded to magnetic circuits which are at proper times respectively opened and closed; but it is too evident that any means whereby synchronous alterations of the impedances of the coils I I II II are obtainable will also do for the purpose.

The invention may be practically carried out as shown in Figs. 3 and 4. Four coils A are mounted upon laminated iron cores B, secured to the frame C of the machine. Two diametrically opposite ⊏-shaped magnetic pieces S (also laminated) are keyed on the shaft M, which is caused to revolve by a synchronous motor. The connections are such as to cause the simultaneous closure of the magnetic circuits of two opposite coils by means of the limbs of the ⊏-shaped pieces S facing them to take place just at the moments when the current is being reversed.

Of course it is obvious that the number and position of the bobbins may be varied for different cases without departing from the spirit of my invention.

As to the applications of the present invention the following remarks may be of interest:

I. The combination of several monophase-current redressers allows of the obtention of a continuous current whose wave shape shows practically no undulation. The larger the number of currents differing in phase which are redressed the greater is the constancy of strength of the continuous current obtained.

II. Such a continuous-current dynamo revolves on receiving continuous current from an outer source and acts as a continuous-current motor without commutator.

III. The combination of the current-redresser with an alternator renders the latter a self-excited alternator.

Having thus described my invention, what I claim, and desire to protect by Letters Patent, is—

1. For redressing the current or currents in a single-phase or polyphase alternating-current circuit or circuits, the combination of a plurality of choking-coils inserted in series into the main of each circuit, two choking-coils, each of which connects one end of one of said series coils with the opposite end of the other, a device for varying the impedance of each of said coils synchronously with the phases of the alternating current flowing through the circuit, consisting in a frame on which said coils are secured at suitable angles to each other while two ⊏-shaped diametrically opposed laminated iron pieces, caused to revolve by a synchronous motor, alternately face the cores of said coils.

2. For redressing the current or currents in a single-phase or polyphase alternating-current circuit or circuits, the combination of two choking-coils inserted in series into the mains of each circuit, two choking-coils, each of which connects one end of one of said series coils with the opposite end of the other, a device for varying the impedance of each of said couple of coils synchronously with the phases of the alternating current flowing through the circuit, consisting in a frame on which said couples of coils are secured at ninety degrees to each other while two ⊏-shaped diametrically opposed laminated iron pieces, caused to revolve by a synchronous motor, alternately face the cores of each couple of said coils.

Witness my hand this 5th day of October, 1903.

LUIGI MAGRINI.

Witnesses:
H. P. SMITH,
MICHELE DE DRAGO.